United States Patent [19]

Cadotte et al.

[11] Patent Number: 4,964,998

[45] Date of Patent: Oct. 23, 1990

[54] USE OF TREATED COMPOSITE POLYAMIDE MEMBRANES TO SEPARATE CONCENTRATED SOLUTE

[75] Inventors: John E. Cadotte, Minnetonka; Joel-Raphael Racchini, St. Louis Park; Robert J. Petersen, Minneapolis, all of Minn.

[73] Assignee: FilmTec Corporation, Minneapolis, Minn.

[21] Appl. No.: 450,706

[22] Filed: Dec. 13, 1989

[51] Int. Cl.$^5$ .............................................. B01D 61/02
[52] U.S. Cl. ................................. 210/654; 210/500.38
[58] Field of Search ............... 210/634, 644, 649–654, 210/500.37, 500.38; 55/16, 158

[56] References Cited

U.S. PATENT DOCUMENTS

| | | | |
|---|---|---|---|
| 4,277,344 | 7/1981 | Cadotte | 210/654 |
| 4,705,636 | 11/1987 | Small et al. | 210/638 |
| 4,812,238 | 3/1989 | Cadotte et al. | 210/636 |
| 4,814,399 | 3/1989 | Sansone et al. | 525/435 |
| 4,828,708 | 5/1989 | Bray | 210/654 |
| 4,888,116 | 12/1969 | Cadotte et al. | 210/500.38 |

FOREIGN PATENT DOCUMENTS 135506  5/1989  Japan .

OTHER PUBLICATIONS

FilmTec Technical Bulletin, "FT30 Reverse Osmosis Membrane Biological Protection and Disinfection", Jan. 1988, FilmTec—4002B.

*Primary Examiner*—Frank Sever

[57] ABSTRACT

A method of separating water of reduced concentration of a selected solute via reverse osmosis, wherein the selected solute is sulfuric acid, sodium hydroxide, isopropanol, sodium nitrate or another solute having a much higher solute passage than sodium chloride. The reverse osmosis membrane is prepared by treating a crosslinked, polyamide discriminating layer with an amine-reactive reagent or compatible oxidant at conditions whereby the passage of the selected solute at a selected transmembrane pressure is reduced by at least 30 percent.

18 Claims, No Drawings

USE OF TREATED COMPOSITE POLYAMIDE MEMBRANES TO SEPARATE CONCENTRATED SOLUTE

BACKGROUND OF THE INVENTION

This invention relates to use of treated composite polyamide membranes to separate concentrated solute via reverse osmosis. More specifically, use of polyamide membranes treated to enhance rejection of certain acids, bases, and organic materials in a reverse osmosis process is contemplated.

Removal of materials dissolved or dispersed in a solution by separation of these materials from the dispersing medium or solvent utilizing reverse osmosis membranes is well known. The membranes used for reverse osmosis are selectively permeable to certain components of the mixture to be separated. Generally, water is the component to which such membranes are especially permeable. An aqueous feed solution is conveniently brought in contact with one surface of the reverse osmosis membrane under pressure so as to effect selective permeation of water through the membrane. This process is most generally used for desalination of water-containing salts. However, reverse osmosis has also been used to separate organic compounds and other materials from aqueous feed solutions.

The performance of reverse osmosis membranes has a critical effect on the efficiency and efficacy of reverse osmosis processes. Advantageously, the reverse osmosis membrane should be relatively impermeable to materials which are to be separated from the water and highly permeable to water. It has been found that membranes having a porous support which provides physical strength but imparts little or no rejection, combined with a thin discriminating layer adherent to the support, are particularly useful. Such membranes are commonly referred to as thin film composite membranes.

Polyamide membranes have been widely employed in reverse osmosis processes. U.S. Pat. No. 4,277,344 describes a variety of membranes having a polyamide discriminating layer on a porous support. These membranes are preferably prepared by interfacial polymerization of a difunctional aromatic amine such as metaphenylene diamine and a trifunctional aromatic acyl halide, such as trimesoyl chloride, optionally containing difunctional acyl halide. A 1,3,5-cyclohexane tricarbonyl chloride can also be employed as the acyl halide reactant. Such membranes are further illustrated in U.S. Pat. Nos. 4,520,044 and 4,606,943. European Patent Application Publication No. 211,633 also describes composite polyamide membranes.

The treatment of membranes to enhance performance is described in the prior art in a number of patents. U.S. Pat. No. 3,551,331 describes a process for modifying the permeability of a substantially linear aliphatic polyamide membrane. In this process, the polyamide membrane is treated with a protonic acid, lyotropic salt or a Lewis acid.

U.S. Pat. No. 3,877,978 describes use of copolymers of vinyl acetate with various ethylenically unsaturated carboxylic acids to enhance the rejection of certain semi-permeable membranes.

U.S. Pat. No. 3,886,066 discloses the use of hydrolyzable tannins to reduce the salt passage through semi-permeable membranes.

U.S. Pat. No. 4,214,020 describes a process for coating exteriors of hollow fiber membranes to enhance their membrane characteristics.

U.S. Pat. No. 4,634,531 describes the use of sequential treatment with a water-soluble amine and a water-soluble aldehyde to improve selective permeation.

U.S. Pat. No. 4,704,324 teaches preparation of membranes by reaction of a nucleophilic first compound with a second compound bearing reactive onium groups.

U.S. Pat. No. 4,812,238 describes the treatment of composite polyamide membranes with nitrous acid or a diazonium compound. The nitrous acid is disclosed to react with pendant amine groups.

U.S. Pat. No. 4,828,700 discloses that reverse osmosis membranes can be treated with polymers bearing carboxylic acid groups and optionally pendant hydroxyl or amide moieties to enhance salt rejection.

U.S. Pat. No. 3,904,519 describes treatment of linear aromatic polyamides with certain crosslinking reagents to improve flux or flux stability of the resulting membranes. Crosslinking reagents employed include aldehydes, polyamines, polycarboxylic acids, polyisocyanates, oxidizing agents, peroxides and other compounds.

U.S. Pat. No. 3,951,815 describes a composite semipermeable membrane formed of an ultrathin film of polyethylenimine on a support, where said film has been crosslinked with difunctional or trifunctional acyl halides, chloroformates, isocyanates and sulfonyl chlorides.

Existing commercial composite polyamide membranes display a good combination of high water flux, good salt rejection and acceptable chemical stability. Membranes which are more tolerant of acidic or basic conditions and which demonstrate a higher rejection for organic materials while maintaining high water flux are still sought.

SUMMARY OF THE INVENTION

An improved process for separating water from an aqueous solution containing at least one selected solute for which the solute passage through a membrane is at least twice that of sodium chloride at like conditions has now been discovered. By "like conditions" is meant equivalent transmembrane pressure, solute concentration and temperature. This process comprises contacting a first side of a treated composite crosslinked polyamide membrane with an aqueous feed solution containing said selected solute at conditions where a chemical potential exists between the first side and a second side of the membrane whereby water having a reduced concentration of the selected solute diffuses through the membrane from the first to second side and collecting the purified water. The treated composite, crosslinked polyamide reverse osmosis membrane is prepared by a process comprising contacting a composite membrane having a crosslinked polyamide discriminating layer with a solution of an effective amount of an amine-reactive reagent or compatible oxidant, whereby the passage through the membrane of the selected solute in an aqueous solution of a given concentration at 25° C. and equivalent operating pressure is reduced by at least 30 percent, more preferably 50 percent, relative to the membrane prior to treatment and the water flux of said membrane is reduced by not more than 50 percent, preferably not more than 40 percent, after treatment.

Selected solutes include sulfuric acid, sodium hydroxide, isopropanol or sodium nitrate.

It has been found that this process employing treated membranes results in a higher rejection than the membrane prior to treatment with minimum loss of flux in separation of purified water from aqueous streams containing the selected solute.

DETAILED DESCRIPTION OF THE INVENTION

Composite reverse osmosis membranes having crosslinked polyamide discriminating layers are well-known. The discriminating layer is advantageously derived from reactants comprising: (a) a compound or polymer bearing at least two primary amine groups and (b) a compound or polymer bearing an average of more than two carboxylic acyl halide groups. The amine and acid halide reactants may be aliphatic, cycloaliphatic or aromatic. Aromatic amines, that is compounds wherein one or more amine groups are bonded to a carbon atom in an aromatic ring, are especially preferred. The amine compound may contain one or two fused or separate aromatic rings in preferred embodiments.

The carboxylic acid halide reactant employed to prepare the polyamide discriminating layer desirably includes an aromatic acyl halide bearing at least three acyl halide groups. The carboxylic acid halide reactant may comprise some compounds or polymers which are difunctional. Preferably, at least 50 mole percent of the carboxylic acid halide reactant is trifunctional or more highly functionalized. The compound bearing the two acyl halide groups optionally bear other substituents which do not interfere with the reaction forming the membrane. Preferably, the carboxylic acid halide is trimesoyl halide. Advantageously, the carboxylic acid halide reactant is trimesoyl halide or cyclohexane-1,3,5-tricarbonyl halide or mixtures of these trifunctional halides. Optionally, isophthaloyl halide and/or terephthaloyl halide may be employed with one or both of the trifunctional halides. The halide is preferably chloride, but may be bromide.

The aromatic amine compound optionally may bear other substituents which do not interfere with the membrane formation reaction. For example, a compound bearing two primary amine groups and one group which has a carbonyl function not adjacent to the amine group, as described in U.S. Pat. No. 4,761,234, may be employed but is not preferred. The preferred amine reactant employed to form the membrane is phenylene diamine, more preferably meta-phenylene diamine.

The composite crosslinked polyamide membrane can be prepared by techniques known in the prior art. Conveniently, interfacial polymerization of an aqueous amine applied to a microporous substrate with an acyl halide in an organic solution such as described in U.S. Pat. No. 4,277,344, can be employed and is incorporated herein by reference. Preferred as an organic solvent is an aliphatic hydrocarbon, such as hexane, or a chlorofluorocarbon, such as 1,1,2-trichlorotrilfluoroethane. Other similar techniques for preparing such membranes are described in U.S. Pat. Nos. 4,606,943; 4,520,044: 4,761,234: 4,772,394; and 4,828,700, and are incorporated herein by reference.

The microporous substrate on which these composite membranes are formed can be any substrate conveniently employed for this purpose. Suitable substrates for composite membranes have been extensively described in the prior art. Illustrative support materials include organic polymeric material such as polysulfone, polyether sulfone, chlorinated polyvinylchloride, styrene/acrylonitrile copolymer, polybutylene terephthalate, cellulose esters and other polymers which can be prepared with a high degree of porosity and controlled pore size distribution. Porous inorganic material may also be operable as supports. Preferably, the surface pores in the support material will have a diameter 2000 Å or less, and the support material will have as high a porosity as is possible, while maintaining the desired pore size, integrity, and strength. Especially preferred as support layers are porous polysulfone films. These films are generally cast on non-woven fabric or woven cloth in the manner described in U.S. Pat. No. 4,277,344. Surface active agents may be employed in the aqueous amine solution to enhance wetting of a hydrophobic substrate.

Especially preferred as membranes to be treated by the method described herein are the membranes disclosed in U.S. Pat. No. 4,277,344. In preferred embodiments, these membranes are prepared by interfacial polymerization of meta-phenylene diamine and trimesoyl chloride. Such membranes are sold by FilmTec Corporation of the designation FT30 membranes.

In one embodiment of the invention, the membrane may be derived from amine reactants or acyl halide reactants which are polymeric. For example, a polymer made by reaction of a difunctional aromatic amine with trimellitic anhydride acid halide optionally mixed with trimesoyl halide, as described in U.S. Pat. No. 4,606,943, is operable as the amine reactant, but is not preferred.

The polyamide of the membrane discriminating layer is crosslinked. These polyamides preferably have a crosslink density of at least about 10 crosslinks, more preferably at least about 50 crosslinks, per 100,000 molecular weight. The crosslink density can be determined by standard end-group analysis techniques and may be estimated by the insolubility or swelling of the resulting polyamide in solvents in which linear polyamides are soluble.

The rejection by the polyamide reverse osmosis membrane of specific solutes and the water flux of the membrane prior to treatment can operably vary over a wide range. The flux and rejection of specific solutes is determined with reference to test conditions using a specific concentration of solutes at a specific pressure and temperature. Preferably, the membrane to be treated will have a sodium chloride rejection of at least about 90 percent, more preferably 95 percent, and a water flux of at least about 12 gallons per square foot per day (gfd), more preferably at least about 15 gfd, when tested using an aqueous 0.2 weight percent sodium chloride solution at a transmembrane pressure of 200 lbs./sq. inch (psi) at 25° C. Membranes having a much higher flux and lower salt rejection prepared as described in U.S. Pat. No. 4,765,897, which is incorporated by reference, can also be employed. Membranes having a higher salt rejection and useful with a seawater feed at a pressure of 800 psi at 25° C. with a flux of at least 10 gfd may also be treated.

The membrane may be in the form of a flat sheet, tubular or hollow fiber configuration. The membrane can be treated either prior to or after assembly into an element. In one especially preferred embodiment, the membrane is fabricated into a spiral membrane device and then treated by the method of this invention to produce a membrane element having enhanced rejection of sulfuric acid, sodium hydroxide and certain organic compounds such as isopropanol.

It is found that the membranes to be treated by the method of this invention are desirably clean. In this context a "clean" membrane is a membrane which has not been subject to extensive service wherein the membrane flux or performance has been reduced by fouling. It has been found that membranes which are freshly prepared and have been subjected to only a brief test, (preferably less than 24 hours, more preferably less than 1 hour) to determine initial reverse osmosis performance or no test prior to treatment are best suited to the treatments of this invention. Membranes which have been in service for an extended time and then are cleaned by standard techniques after being fouled are not as susceptible to treatment by the method of this invention.

The reagent employed in treating the composite crosslinked polyamide membrane is reactive with hydrogens on primary or secondary amines at the conditions employed for treatment or modifies the membrane via an oxidation reaction. This reaction may be a displacement reaction or an oxidation. Strong oxidizing reagents employed for an extended period of contact do not as conveniently provide the desired modification. The reagent is preferably selected from the group consisting of an amine-reactive organic halogen compound which will alkylate primary amine groups at conditions of treatment herein, a carboxylic acid anhydride, a carboxylic acid ester, a compatible oxidant, an amine-reactive ethylenically-unsaturated compound, nitrous acid, a precursor of nitrous acid or a 1,3-heterocyclic sultone. These reagents may be difunctional or more highly functional compounds in which case some additional crosslinking may be introduced into the desalinizing layer by the treatment. More preferably, the reagents are monofunctional. The reagent may be inertly substituted, which means the reagent may contain moieties in addition to the amine-reactive group, provided said moieties do not interfere with the desired reaction. Preferably, the amine-reactive reagent has a molecular weight of less than about 300, more preferably less than about 150.

The alkylating, organic halogen reagents employed may include those activated by an electron withdrawing group, such as a carboxylic acid group, in the $\beta$ position. The sodium salt of chloroacetic acid is especially preferred.

The oxidizing reagents include a peroxycarboxylic acid, persulfuric acid or periodic acid, with peracetic acid being especially preferred. Strong oxidizing reagents, such as chromic acid, may deleteriously affect the membrane.

Illustrative carboxylic acid anhydride agents include acetic anhydride, and propionic anhydride, with acetic anhydride being especially preferred. Illustrative carboxylic acid ester reagents include methyl acetate and ethyl acetate, with methyl acetate being especially preferred.

The term "compatible oxidant" as used herein refers to oxidizing agents which do not deleteriously affect the properties of the composite membrane when employed for a short time period. Such oxidants include peracetic acid, periodic acid, and may include sodium hypochlorite, the use of which for treatment of a reverse osmosis membrane is suggested in U.S. Pat. No. 4,277,344. It has now been found that sodium hypochlorite is not generally a compatible oxidant, if the solute is sodium hydroxide.

Ethylenically unsaturated compounds, such as acrylic acid or vinyl sulfonic acid, which react with primary or secondary amines, can also be employed. Some of these reagents, such as acrylic acid, are also zwitterion precursors at the appropriate pH. By the term "zwitterion precursor" is meant a compound which will react with a primary amine group to form a product containing both a positive and negative charge in the same molecule.

Illustrative of 1,3-heterocyclic sultone reagents are compounds corresponding to the formula:

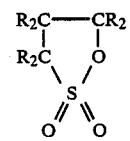

where R at each occurrence is independently H or a $C_1$ to $C_4$ alkyl. Preferably, R at each occurrence is H, except one or two occurrences may be ethyl or methyl groups. R at each occurrence is most preferably H.

The amine-reactive reagents employed herein are believed to react with pendant amine groups remaining in the desalinizing layer to cap or crosslink such groups. A similar reaction was postulated for treatment for such membranes with nitrous acids in U.S. Pat. No. 4,812,238. It is noteworthy that nitrous acid has been found to enhance sulfuric acid rejection of these membranes. The oxidizing reagents employed herein produce complex reactions which are not fully understood, but are believed to render amine groups less basic. The present invention is not limited by any specific theory as to how the subject reagents enhance rejection of certain materials by the subject membranes.

Reactions with the membrane may involve ring opening, as well as oxidations, acylation or alkylation reactions. These different chemical modifications will not necessarily affect rejection of all solutes in the same manner. Rejection of some solutes may be enhanced after treatment while rejection of other solutes may decrease.

The reagent preferably contacts the discriminating layer of the composite crosslinked polyamide membrane while in a liquid diluent. Preferably, this diluent does not deleteriously affect either the discriminating layer or the support layer of the composite membrane. Advantageously, the amine reactive reagent is dissolved in the diluent. The suitability of a diluent will depend upon the specific composition of the desalinizing layer, the nature of the amine reactive agent and the composition of the support. An effective amount of the reagent is employed to impart the desired rejection properties to the membrane after treatment without deleterious affects on the membrane. An aqueous solution of from 0.1 to about 1 percent of the amine-reactive reagent or compatible oxidant is generally preferred. Diluents other than water may be preferred if water will react with the reagent. Co-solvents can be employed with water but are generally not necessary nor desirable. Suitable co-solvents include the lower alkanols, such as isopropanol or ethanol, and amides, such as N,N-dimethylformamide.

Amine-reactive reagents which react with or hydrolyze in water can be employed in other diluents. For example, acetic anhydride can be employed in an isopropanol diluent.

The time required for the desired properties to be imparted to the membrane will vary dependent on the nature of the desalinizing layer, the identity of the amine-reactive reagent or oxidizing reagent, temperature, concentration of the reagent, and other factors. Preferably, the reagent in water or other diluent should flow continuously over the membrane surface during treatment to replenish the reagent in contact with the surface. Typically, contact times in the range of 0.5 hour to 24 hours or more are desirable. The longer contact times are typically required with reagents of higher molecular weight, which will penetrate the desalinizing layer of the membrane slowly.

The temperature during treatment of the membrane is desirably maintained so as to avoid deleterious effects on the membrane. Too high a temperature may reduce flux through and/or solute rejection by the membrane while too low a temperature may lead to undesirably long contact times for the treatment. Generally, temperatures in the range from about 15° to about 50° C., preferably about 20° to about 35°, are advantageous.

The treatment is conveniently conducted at atmospheric pressure, but a positive transmembrane pressure differential can optionally be employed.

The treatment of composite, crosslinked, polyamide reverse osmosis membranes described herein can enhance the rejection of specific compounds by such membranes. In particular, the rejection of sulfuric acid, sodium hydroxide, sodium nitrate and various organic compounds, such as isopropanol, can be affected by these treatments. Moreover, the rejection of common salts, such as sodium chloride, may also be enhanced by these treatments. Not all rejections of all compounds are necessarily affected to the same degree by various treatments. Sulfuric acid rejection can frequently be employed to indicate whether or not the treatment has in fact affected rejection of the membrane. Preferably, the aqueous feed solution has a pH in the range from about 1 to about 14, more preferably about 2 to about 13. However, it is desirable to evaluate any membrane with the particular stream with which said membrane will be employed in order to determine the effectiveness of this treatment in enhancing rejection of specific solutes.

The conditions employed for reverse osmosis for a specific feed can readily be determined by one skilled in the art. Transmembrane pressure must be great enough to overcome the osmotic pressure of the feed, but not so great as to cause excessive compaction, deleterious affects on the membrane element or excessive energy consumption in achieving the feed pressure. A transmembrane pressure of at least about 200 psi is employed with simple monovalent salts at concentrations up to about 0.1 molar concentration. Advantageously, the transmembrane pressure should be at least twice the osmotic pressure of the feed. The temperature during reverse osmosis must not adversely affect the membrane or its characteristics. A temperature in the range from about zero to about 50° C. is generally convenient.

The following examples are presented to illustrate the invention, but are not otherwise intended to limit the subject invention. All parts and percentages are by weight unless otherwise indicated. Passage of a solute is in percent and is calculated by subtracting the rejection of said solute in percent from 100. Water flux is reported in gallons per square foot (of membrane) per day (gfd). The concentration of the solute in the feed water is specified, as is the pressure of the feed during evaluation of the membrane performance. The temperature of the feed water during these reverse osmosis tests is ambient, generally about 18° to 25° C., and flux data was then normalized to 25° C. using standard tables available for the commercial membrane of the type treated. The membrane used in the examples is a membrane available from FilmTec Corporation under the designation FT30 membrane, unless otherwise indicated.

The FT30 membrane is a composite crosslinked polyamide membrane having a polysulfone support and a desalinizing layer prepared by the interfacial polymerization of meta-phenylene diamine in an aqueous medium with trimesoyl chloride in an organic medium The FT30 membrane is prepared in accordance with U.S. Pat. No. 4,277,344. If the membrane is dried, it is desirable to employ a surface active agent prior to drying to make the membrane more readily wettable.

EXAMPLE 1

Samples of FT30 membrane are evaluated in reverse osmosis tests employing four different aqueous solutions containing either 0.2 percent sodium chloride, 0.2 percent sodium nitrate, 0.2 percent sodium hydroxide, or 1000 parts per million isopropyl alcohol (IPA). Each of these four solutes is evaluated with a feed pressure of 200 pounds per square inch (psi). In addition, a solution of 2 percent sulfuric acid at a feed pressure of 450 psi is evaluated. The results of this evaluation are tabulated as Comparative Experiment 1 in Table I. The flux and rejection for each of the five feed streams is listed in the table.

A sample of FT30 membrane like that used in Comparative Experiment 1 is then treated with a 0.1 percent solution of acetic anhydride in isopropanol for a period of 24 hours at ambient temperature with no pressure applied across the membrane. The treated membrane is then retested with the five feed solutions employed with Comparative Experiment 1. The results of these evaluations are tabulated in Table I.

TABLE I

| Membrane Treatment | 0.2% NaCL at 200 psi | | 0.2% NaNO$_3$ at 200 psi | | 2% H$_2$SO$_4$ at 450 psi | | 0.2% NaOH at 200 psi | | 1000 ppm IPA at 200 psi | |
|---|---|---|---|---|---|---|---|---|---|---|
| | Flux | Solute Passage | Flux | Solute Passage | Flux | Solute Passage | Flux | Solute Passage | Flux | Solute Passage |
| Comparative Experiment 1 | 27 | 2.6 | 27 | 9.1 | 30 | 7.2 | 23 | 20 | 30 | 19 |
| Example 1 | 21 | 2.4 | 21 | 7.3 | 21 | 1.9 | 16 | 15 | 22 | 15 |

It is apparent from Table I that the treatment with acetic anhydride decreased the flux of water through each membrane and also decreased the solute passage through said membrane. The decrease in solute passage for sodium chloride is minimal, but solute passage declines for the other solutes tested ranged from about 20 percent to over 70 percent. The flux declined by about 20 to 30 percent in each of the evaluations.

EXAMPLE 2

A FT30 membrane is evaluated in sodium chloride rejection with a 0.2 percent aqueous solution at 200 psi. The water flux through this membrane (Comparative Experiment 2) is 32 gfd and solute passage was 3.6 percent. A FT30 membrane is then treated with a 0.1 percent solution of acetic anhydride in water with a transmembrane pressure of 200 psig for a period of 2 hours. The membrane after treatment exhibits a water flux of 22.3 gfd and a solute passage of 1.4 percent. This illustrates that treatment with acetic anhydride can be employed to raise the sodium chloride rejection of certain crosslinked polyamide composite membranes.

EXAMPLES 3 AND 4

A FT30 membrane is tested for solute passage and flux with a 0.2 percent aqueous sodium chloride solution at 200 psi, then a 1000 parts per million solution of isopropyl alcohol at 200 psi and then a 0.2 percent sodium nitrate solution at 200 psi, followed by extended sodium chloride rejection testing for a period of over 450 hours. The results of these reverse osmosis tests are tabulated in Table II as Comparative Experiment 3.

A FT30 membrane like that in Comparative Experiment 3 is treated with acetic anhydride in a 0.1 percent solution in 90/10 water/isopropyl alcohol for a period of 24 hours at about 25° C. The resulting treated membrane is evaluated with feed streams in the same manner as the membrane in Comparative Experiment 3. The results of this evaluation are tabulated in Table II as Example 3.

In Example 4, a fresh clean sample of FT30 membrane is treated with 1,3-propane sultone in a 0.1 percent solution plus 0.1 percent Na$_2$CO$_3$ in 90/10 water/isopropyl alcohol at a temperature of about 25° C. for 72 hours. The resulting membrane was also evaluated in reverse osmosis test in a manner similar to the membrane in Comparative Experiment 3 and results tabulated in Table II.

TABLE II

| RO Test* | Comparative Experiment 3 | | Example 3 | | Example 4 | |
|---|---|---|---|---|---|---|
| | Flux | Sol. Passage | Flux | Sol. Passage | Flux | Sol. Passage |
| 0.2% NaCl at 200 psi initial | 28 | 5 | 19 | 1.4 | 22 | 0.9 |
| 1000 ppm IPA at 200 psi | 30 | 29 | 21 | 15 | 24 | 14 |
| 0.2% NaNO$_3$ at 200 psi (initial) | 29 | 14.4 | 20 | 6 | 24 | 2.2 |
| 0.2% NaCl at 200 psi 48 hours | 26 | 3.6 | 24 | 3.5 | 24 | 0.9 |
| 0.2% NaCl 96 hours | 25 | 3.0 | 23 | 2.8 | 24 | 0.8 |
| 0.2% NaCl 120 hours | 21 | 1.9 | 19 | 1.0 | 21 | 0.5 |
| 0.2% NaCl 168 hours | 18 | 1.2 | 16 | 1.0 | 18 | 0.4 |
| 0.2% NaCl 216 hours | 16 | 1.0 | 16 | 0.9 | 17 | 0.4 |
| 0.2% NaCl 288 hours | 16 | 0.8 | 16 | 0.8 | 17 | 0.4 |
| 0.2% NaCl 384 hours | 14 | 0.9 | 14 | 1.0 | 15 | 0.4 |
| 0.2% NaCl 456 hours | 16 | 1.0 | 16 | 1.0 | 17 | 0.5 |
| 0.2% NaCl after cleaning | 19 | 1.2 | 17 | 1.2 | 20 | 0.7 |

Table II illustrates that treatment with acetic anhydride reduces the water flux of the treated membrane but more significantly reduces the solute passage of sodium chloride, isopropyl alcohol, and sodium nitrate through said membrane. In an extended test, the sodium chloride passage after 168 hours converges with that of the membrane in Comparative Experiment 3. In general, some decline in sodium chloride passage with time would be expected by one skilled in the art.

The treatment with 1,3-propane sultone decreases the flux less than the acetic anhydride treatment while reducing the solute passage to a greater degree. The passage of sodium chloride through the membrane remains low throughout extended testing and the flux is comparable to that of Comparative Experiment 3.

EXAMPLES 5–8

A FT30 membrane similar to that employed in Comparative Experiment 1 is evaluated in Comparative Experiment 4 employing a 0.2 percent aqueous sodium chloride solution at 200 psi, a sulfuric acid solution of pH 1 at 400 psi and a sodium hydroxide solution of pH 12 at 200 psi, in three sequential reverse osmosis tests. A sample of membrane like that used in Comparative Experiment 4 is treated with 0.2 percent acetic anhydride in a water solvent for 20 hours at about 25° C. in Example 5. The treated membrane is then tested sequentially with sodium chloride, sulfuric acid, and sodium hydroxide feed streams like those used in Comparative Experiment 4 and the results are tabulated in Table III.

A sample of FT30 membrane is treated with 0.1 percent 1,3-propane sultone plus one percent NaHCO$_3$ in water at about 25° C. for 20 hours and evaluated in the same reverse osmosis tests as Comparative Experiment 4. Results of these evaluations are tabulated in Table III as Example 6.

In Comparative Experiment 5, another sample of a commercially available crosslinked polyamide membrane sold under the designation of FT30 is evaluated in reverse osmosis tests using aqueous sodium chloride, sulfuric acid and sodium hydroxide like those employed for Comparative Experiment 4. The results are tabulated in Table III.

A sample of the membrane like that employed in Comparative Experiment 5 is then treated with 1 percent aqueous peracetic acid for 24 hours at about 25° C. The resulting membrane was evaluated with reverse osmosis tests employing sodium chloride, sulfuric acid, and sodium hydroxide. The results of these evaluations are tabulated in Table III as Example 7.

In Example 8, a sample of the membrane like that employed in Comparative Experiment 5 is treated with a stirred 0.1 percent 1,3-propane sultone and one percent NaHCO$_3$ aqueous solution at about 25° C. for 24 hours. The membrane is then evaluated using the same three feed streams as used in Comparative Experiment 5. The flux and solute passage of the treated membrane are tabulated in Table III.

TABLE III

| Comparative Experiment | Example | Treatment | 0.2% NaCl at 200 psi Flux | 0.2% NaCl at 200 psi Solute Passage | H₂SO₄ (pH 1) at 400 psi Flux | H₂SO₄ (pH 1) at 400 psi Solute Passage | NaOH (pH 12) at 200 psi Flux | NaOH (pH 12) at 200 psi Solute Passage |
|---|---|---|---|---|---|---|---|---|
| 4 | — | Control | 25 | 3.1 | 18 | 24 | 28 | 8.4 |
| — | 5 | 0.2% acetic anhydride | 18 | 1.8 | 11 | 4.8 | 21 | 7.4 |
| — | 6 | 0.1% 1,3-propane sultone | 19 | 0.7 | 14 | 6.3 | 30 | 2.9 |
| 5 | — | Control | 33 | 4.3 | 33 | 14 | 35 | 15 |
| — | 7 | 1% Per-acetic acid | 27 | 1.2 | 20 | 1 | 25 | 4.9 |
| — | 8 | 0.1% 1,3-propane sultone | 18 | 1.4 | 22 | 5.8 | 24 | 4.7 |
| 6 | — | Lab formed FT30 control | 14 | 0.8 | 24 | 7 | 21 | 4.8 |

In Comparative Experiment 6, a membrane is formed by immersing by hand a polysulfone microporous support in aqueous meta-phenylene diamine and then treating said support with trimesoyl chloride in a 1,1,2-trichlorotrifluorethane solvent at ambient temperature. The resulting laboratory-produced membrane was evaluated in reverse osmosis test as tabulated in Table III. It is interesting to note that the lab-prepared membrane without any treatment displays lower flux and lower solute passage than the commercially available membrane in Comparative Experiments 4 and 5. The treatments in Example 7 and 8 attain lower solute passages for sulfuric acid and sodium hydroxide then the membrane from which each is prepared. Likewise, the membranes of Examples 5 and 6 display lower flux and lower solute passages for both sulfuric acid and sodium hydroxide then the membrane of Comparative Experiment 4. The effects of these treatments on sodium chloride rejection are not as dramatic. The peracetic treatment appears to have the least affect on water flux. The peracetic acid significantly reduces solute passage of all the feed streams evaluated.

EXAMPLES 9–11

A control sample of a FT30 membrane is evaluated in Comparative Experiment 7 with three separate feed streams in a manner similar to Comparative Experiment 4. The three feed streams are 0.2 percent aqueous sodium chloride at 200 psi, sulfuric acid at pH 1 at 400 psi and sodium hydroxide at pH 12 at 200 psi.

In Comparative Experiment 8, a sample of the membrane like that evaluated in Comparative Experiment 7 is treated with 1 percent aqueous hydrogen peroxide at a pH of 7 for 20 hours at about 25° C. The treated membrane is then evaluated with the same three feed streams as Comparative Experiment 7 and the results of these evaluations are tabulated in Table IV.

A FT30 membrane is treated with 1 percent hydrogen peroxide plus 2 percent sulfuric acid in an aqueous solution at about 25° C. for 20 hours. The treated membrane is then evaluated with aqueous feed streams of various solutes and their results are tabulated in Table IV as Comparative Experiment 9.

In Comparative Experiment 10, a sample of FT30 membrane is treated with an aqueous solution of 1 percent hydrogen peroxide and 1 percent acetic acid for 20 hours at about 25° C. The treated membrane is then evaluated in reverse osmosis tests and the results of these tests are tabulated in Table IV.

In Comparative Experiment 11, another sample of an FT30 composite polyamide membrane is evaluated in reverse osmosis tests using three solutes as tabulated in Table IV. A sample of FT30 membrane is treated with an aqueous solution of 1 percent hydrogen peroxide and 0.1 percent sodium hydroxide at a pH of 9 for a period of 20 hours at about 25° C. The treated membrane is evaluated in reverse osmosis tests and results are reported in Table IV as Comparative Experiment 12.

A sample of the membrane like that evaluated in Comparative Experiment 11 is treated for 1 hour at about 25° C. with an aqueous solution of 1 percent peracetic acid, at a pH of 1.5. The resulting treated membrane was evaluated in reverse osmosis tests and the results of these tests are shown in Table 4 as Example 9.

A sample of the membrane like that evaluated in Comparative Experiment 11 is treated with an aqueous solution of 1 percent peracetic acid for 24 hours at about 25° C. This membrane is evaluated in reverse osmosis tests and the results of these tests are reported in Table 4 as Example 10.

In Comparative Experiment 13 another sample of commercially available membrane sold under the designation FT30 membrane by FilmTec Corporation is evaluated in reverse osmosis test and the results of these tests are shown in Table IV. A sample of FT30 membrane employed is then treated with 100 parts per million of sodium hypochlorite for 24 hours at about 25° C. The treated membrane is then evaluated in a series of reverse osmosis tests and results of these test are tabulated in Table IV as Example 11.

TABLE IV

| Comparative Experiment | Example | Treatment | 0.2% NaCl at 200 psi Flux | 0.2% NaCl at 200 psi Sol. Passage | H₂SO₄ at 400 psi Flux | H₂SO₄ at 400 psi Sol. Passage | NaOH at 200 psi Flux | NaOH at 200 psi Sol. Passage |
|---|---|---|---|---|---|---|---|---|
| 7 | — | Control | 29 | 4.9 | 34 | 16 | 28 | 27 |
| 8 | — | 1% H₂O₂ (neutral pH) | 25 | 4.4 | 33 | 12 | 28 | 24 |
| 9 | — | 1% H₂O₂ + 2% H₂SO₄ | 28 | 5.6 | 33 | 17 | 27 | 29 |
| 10 | — | 1% H₂O₂ + 1% acetic | 30 | 6 | 32 | 16 | 27 | 27 |

TABLE IV-continued

|  |  |  | RO Tests | | | | | |
|---|---|---|---|---|---|---|---|---|
|  |  |  | 0.2% NaCl at 200 psi | | $H_2SO_4$ at 400 psi | | NaOH at 200 psi | |
| Comparative Experiment | Example | Treatment | Flux | Sol. Passage | Flux | Sol. Passage | Flux | Sol. Passage |
|  |  | acid |  |  |  |  |  |  |
| 11 | — | Control | 28 | 7.3 | 32 | 9.7 | 32 | 9.7 |
| 12 | — | 1% $H_2O_2$ + 0.1% NaOH (pH 9) | 32 | 4.4 | 36 | 18 | 36 | 11 |
| — | 9 | 1% peracetic acid (pH 1.5) (1 hour) | 24 | 5.0 | 23 | 3.7 | 25 | 6.3 |
| — | 10 | 1% peracetic acid (24 hour) | 23 | 2.8 | 22 | 2.1 | 24 | 4.6 |
| 13 | — | Control | 21 | 9.3 | 27 | 18 | 24 | 21 |
| — | 11 | 100 ppm NaOCl, 14 hours | 27 | 3.4 | 25 | 1.2 | 62 | 45 |

From the data in Table IV it is apparent that peracetic acid significantly increased the rejection of the membrane for all solutes evaluated with little impact on the flux of said membrane. The membrane samples treated with hydrogen peroxide at various pH's showed much less decrease in solute passage but also little affect on the water flux was observed.

The membrane treated with sodium hypochlorite showed enhanced water flux and sodium chloride rejection as is taught in U.S. Pat. No. 4,277,344. The sulfuric acid rejection of the membrane was increased with minimal decrease in flux. However, the sodium hypochlorite treatment in combination with sodium hydroxide testing results in a membrane with a very high flux and a very high solute passage.

EXAMPLES 12-18

A control sample of a FT30 membrane was evaluated with two separate feed streams for reverse osmosis performance. The first stream contained 0.2 percent sodium chloride in an aqueous solution at a pressure of 200 psi and a second feed stream of 0.2 percent sodium nitrate at a feed pressure of 200 psi. Two separate membranes were evaluated and the results are tabulated in Table V in Comparative Experiments 14 and 15.

In Example 12 a sample of FT30 membrane is treated with an aqueous 0.2 percent solution of 1,3-propane sultone for a period of 20 hours at about 25° C. The water flux and solute passage with the sodium chloride and sodium nitrate solutions are determined and the results are tabulated in Table V.

In Example 13 a 0.2 percent aqueous solution of the sodium salt methacrylic acid is used to treat a clean sample of FT30 membrane for a period of 20 hours. The water flux and solute passage with sodium chloride and sodium nitrate solutions are determined and are tabulated in Table V.

In Example 14 a sample of a clean membrane like that evaluated in Comparative Experiment 14 was treated with a 0.2 percent aqueous solution of the sodium salt of vinyl sulfonic acid for 20 hours. The treated membrane is then evaluated with sodium chloride and sodium nitrate and the results are tabulated in Table V.

Examples 12, 13 and 14 demonstrate that significantly reduced solute passages can be obtained by treatment with 1,3-propane sultone, the sodium salt of methacrylic acid and the sodium salt of vinyl sulfonic acid with only minimal, if any, decrease in water flux.

In Examples 15, 16, 17, and 18 samples of clean membrane like that evaluated in Comparative Experiment 15 were treated with various aqueous solutions of reagents as listed in Table V. All these reagents are at concentrations of 0.2 percent in the aqueous solution and the treatment time is 20 hours. The untreated membrane in Comparative Experiment 15 possesses a higher sodium chloride passage than the membrane in Comparative Experiment 14. A greater decrease in flux after treatment with reagents is observed in Examples 15-18 than is observed in Examples 12-14.

TABLE V

|  |  |  | RO Tests Results | | | |
|---|---|---|---|---|---|---|
|  |  |  | 0.2% NaCl at 200 psi | | 0.2% $NaNO_3$ at 200 psi | |
| Comparative Experiment | Example | Membrane Treatment | Flux | Solute Passage | Flux | Solute Passage |
| 14 | — | Control | 24 | 2 | 25 | 5.6 |
| — | 12 | 1,3-Propane Sultone | 20 | 0.4 | 22 | 1.1 |
| — | 13 | Methacrylic Acid* | 27 | 1.0 | 29 | 4 |
| — | 14 | Vinyl Sulfonic Acid* | 27 | 1.0 | 29 | 4.6 |
| 15 | — | Control | 34 | 5.0 | 37 | 12 |
| — | 15 | Methacrylic Acid* | 19 | 2.1 | 22 | 5.3 |
| — | 16 | Vinyl Sulfonic Acid* | 20 | 1.7 | 23 | 4.3 |
| — | 17 | Acrylamide | 20 | 2.2 | 24 | 5.7 |
| — | 18 | Chloracetic Acid | 21 | 1.6 | 26 | 5 |

*In the sodium salt form.

EXAMPLES 19 and 20

A commercially available FT30 membrane is coated with an aqueous solution of 42.5 percent phosphoric acid, the excess acid is then allowed to drain from the surface and the treated membrane dried at a 120° C. until the surface appears visibly dry. This treatment is generally as described in Example 4 of U.S. Pat. No. 4,765,897. The resulting membrane, as indicated in Table VI as Comparative Experiment 16, possesses a flux of 33 gfd and solute passage of 70 percent using a 0.2 percent aqueous sodium chloride solution at 100 psi.

A clean sample of FT30 membrane is then treated with a 0.1 percent aqueous solution of 1,3-propane sultone for a period of 20 hours. The resulting treated membrane was tested once again with 0.2 percent sodium chloride at 100 psi and the results are tabulated as Example 19 in Table VI. The solute passage was reduced by more than two-thirds and the flux actually increased.

The membrane treated with 1,3-propane sultone was then treated with a colloid of tannic acid in a general manner described in Example 12 of U.S. Pat. No. 4,765,897. The resulting membrane was tested using a 0.2 percent sodium chloride solution at 100 psi. The results are tabulated in Table VI as Example 20.

TABLE VI

| Comparative Experiment | Example | Treatment | 0.2% NaCl 100 psi Flux (gfd) | Solute Passage (%) |
|---|---|---|---|---|
| 16 | — | FT30 coated 42.5% $H_3PO_4$ Heated at 120° C. | 33 | 70 |
| — | 19 | 0.1% 1,3-propane sultone | 39 | 22 |
| — | 20 | Example 19 treated with tannic acid | 14 | 6 |

EXAMPLES 21-23

Two samples of a commercial FT30 membrane are tested to determine the water-flux and solute passage with four different feed streams in Comparative Experiment 17. The feed streams include 0.2 percent sodium chloride, 0.2 percent sodium nitrate, sulfuric acid at a pH of 1 and sodium hydroxide at a pH of 12. All tests, except the sulfuric acid, are conducted at 200 psi. The sulfuric acid test is conducted at 400 psi. Samples of membrane like those evaluated in Comparative Experiment 17 are treated with 0.1 percent aqueous peracetic acid in Example 21, with 0.1 percent periodic acid in Example 22 and with 1,000 parts per million chloramine in Example 23. All the treatment solutions are aqueous solutions and the treatments are for a period of three days at a temperature in the range of about 25° C.

The treated membranes are then evaluated in reverse osmosis tests and the results are tabulated in Table VII.

TABLE VII

| Comparative Experiment | Example | Treatment | RO Tests | | | | | | | |
|---|---|---|---|---|---|---|---|---|---|---|
| | | | 0.2% NaCl at 200 psi | | 0.2% $NaNO_3$ at 200 psi | | $H_2SO_4$, pH 1 at 400 psi | | NaOH, pH 12 at 200 psi | |
| | | | Flux | Solute Passage | Flux | Solute Passage | Flux | Solute Passage | Flux | Solute Passage |
| 17 | — | Control | 17 | 12.3 | 21 | 16.1 | 21 | 13.5 | 18 | 17 |
| | | | 16 | 8.2 | 20 | 7.2 | 20 | 13.8 | 17 | 16 |
| — | 21 | 0.1% Peracetic Acid | 14 | 4.2 | 18 | 7.4 | 19 | 1.9 | 17 | 8 |
| | | | 15 | 4.6 | 19 | 8.2 | 20 | 2.2 | 18 | 8 |
| | 22 | 0.1% Periodic Acid | 33 | 5.4 | 34 | 10.1 | 43 | 2.9 | 53 | 23 |
| | | | 33 | 5.1 | 34 | 10.6 | 42 | 2.5 | 53 | 23 |
| | 23 | 1000 ppm Chloramine | 34 | 10.1 | 36 | 11.5 | 43 | 5.4 | 40 | 13 |
| | | | 34 | 10.6 | — | 15.1 | 42 | 6.8 | 39 | 14 |

The peracetic acid treated membranes generally show the lowest solute passage with all of the solutes after treatment. The periodic acid treatment shows generally higher fluxes then the membrane prior to treatment and reduced solute passage for sulfuric acid and sodium chloride. The solute passage of sodium nitrate after the periodic acid treatment was lower than the FT30 control membrane but higher than the peracetic acid-treated membrane. The periodic acid treated membrane showed very high flux and poor solute passage in testing with sodium hydroxide. The chloramine-treated membrane also showed higher fluxes than the control, but the solute passages were generally comparable after chloramine treatment to that of the membrane prior to the treatment with the exception of the sulfuric acid solute passage which was reduced by more than 50 percent.

EXAMPLES 24-26

In Comparative Experiment 18 a FT30 membrane is evaluated in reverse osmosis tests with four solutions in a manner similar to Comparative Experiment 17. Two samples of FT30 membrane are then treated with either peracetic acid, periodic acid, or chloramine in the general manner of Examples 21, 22 or 23, respectively, except that the treatment was 24 hours in duration. The results of the reverse osmosis tests of the control and treated membranes are tabulated in Table VIII.

TABLE VIII

| Comp. Exp. | Example | Membrane Treatment | RO Tests | | | | | | | | | |
|---|---|---|---|---|---|---|---|---|---|---|---|---|
| | | | 0.2% NaCl at 200 psi | | 0.2% $NaNO_3$ at 200 psi | | 1000 ppm IPA at 200 psi | | $H_2SO_4$, pH 1 at 400 psi | | NaOH, pH 12 at 200 psi | |
| | | | Flux | Solute Passage | Flux | Solute Passage | Flux | Solute Passage | Flux | Solute Passage | Flux | Solute Passage |
| 18 | — | Control | 33 | 2.5 | 36 | 14.8 | 39 | 19 | 36 | 8.4 | 32 | 8.8 |
| | | | 34 | 2.6 | 38 | 15.4 | 41 | 19 | 26 | 8.4 | 33 | 9.0 |
| — | 24 | 0.1% Peracetic Acid | 24 | 1.3 | 27 | 6.8 | 30 | 16 | 26 | 0.8 | 22 | 5.6 |
| | | | 24 | 1.2 | 26 | 5.1 | 28 | 16 | 25 | 0.7 | 21 | 5.4 |
| — | 25 | 0.1% Periodic Acid | 21 | 2.6 | 23 | 10.9 | 28 | 22 | 23 | 5.2 | 19 | 7.4 |
| | | | 22 | 4.1 | 25 | 14.7 | 25 | 26 | 23 | 6.3 | 20 | 8.6 |
| — | 26 | 1000 ppm | 24 | 1.7 | 26 | 5.5 | 26 | 27 | 25 | 1.6 | 26 | 8.4 |

TABLE VIII-continued

| | | | RO Tests | | | | | | | | |
|---|---|---|---|---|---|---|---|---|---|---|---|
| | | | 0.2% NaCl at 200 psi | | 0.2% NaNO$_3$ at 200 psi | | 1000 ppm IPA at 200 psi | | H$_2$SO$_4$, pH 1 at 400 psi | | NaOH, pH 12 at 200 psi |
| Comp. Exp. | Example | Membrane Treatment | Flux | Solute Passage | Flux | Solute Passage | Flux | Solute Passage | Flux | Solute Passage | Flux | Solute Passage |
| | | Chloramine | 24 | 2.3 | 27 | 7.2 | 28 | 28 | 26 | 1.8 | 27 | 8.7 |

The water flux of all the membranes is somewhat reduced by the treatments but the solute passage is likewise reduced with the exception of the membranes treated with periodic acid and chloramine, which show increased solute passage for isopropyl alcohol.

EXAMPLES 27-30

A composite crosslinked polyamide membrane intended for use in seawater desalination and available commercially under the designation SW30HR from FilmTec Corporation is evaluated with simulated seawater containing 3.5 percent mixture of sodium chloride and other salts at 800 psi. The SW30HR membrane is similar in composition to the FT30 membrane. The composition of the simulated seawater is:

| | Percent by Weight |
|---|---|
| NaCl | 58.49 |
| MgCl$_2$.6H$_2$O | 26.46 |
| NaSO$_4$ | 9.75 |
| CaCl$_2$ | 2.765 |
| KCl | 1.645 |
| NaHCO$_3$ | 0.477 |
| KBr | 0.238 |
| H$_3$BO$_3$ | 0.071 |
| SrCl$_2$.6H$_2$O | 0.095 |
| NaF | 0.007 |

The flux and solute passage of two samples of this membrane are tabulated in Table IX as Comparative Experiment 19.

Samples of the SW30HR control are then treated with 0.1 percent aqueous peracetic acid for 24 hours in Example 27. The flux and solute passage of the treated membrane with simulated seawater is tabulated in Table IX.

The SW30HR membrane in two samples is treated with 0.1 percent periodic acid for 25 hours. The reverse osmosis test results for these samples are tabulated in Table IX as Example 28.

TABLE IX

| | | | RO Tests 3.5% SSW at 800 psi | |
|---|---|---|---|---|
| Comparative Experiment | Example | Treatment | Flux | Solute Passage |
| 19 | — | SW30HR Control | 13 | 0.5 |
| " | | | 14 | 0.5 |
| — | 27 | 0.1% Peracetic Acid, 24 hrs. | 11 | 0.4 |
| | " | | 11 | 0.4 |
| — | 28 | 0.1% Periodic acid, 25 hrs. | 15 | 1.4 |
| | " | | 15 | 1.6 |
| — | 29 | 1000 ppm Chloramine | 25 | 1.0 |
| | " | | 24.2 | 1.7 |
| — | 30 | 1000 ppm Chloramine adjusted to pH 1 | 11 | 0.6 |
| | " | | 10 | 0.6 |

Two samples of the SW30HR membrane are treated with 1000 parts per million chloramine in water for 20 hours. The reverse osmosis tests in Example 29 results indicated a higher water flux and moderately higher solute passage.

In Example 30, the SW30HR membrane was also treated with 1000 parts per million chloramine but in a solution adjusted to a pH of 1. The water flux of this treated membrane was slightly lower than prior to treatment and the solute passage was marginally increased.

EXAMPLE 31

A commercially available FT30 membrane is coated with 85 percent phosphoric acid and treated at 120° C. as generally described in U.S. Pat. No. 4,765,897. It is then incorporated into spiral wound reverse osmosis elements.

A clean sample of this membrane in spiral element form is treated with 0.3 percent peracetic acid for 16 hours. The resulting membrane element along with an untreated control, is then treated with a tannic acid colloid as described in U.S. Pat. No. 4,765,897. Both membranes were subjected to the following series of tests: (1) tested on 0.2 percent MgSO$_4$ at 70 psi, (2) stored in a biostatic storage solution for 15 days, (3) retested on 0.2 percent MgSO$_4$ at 70 psi, and (4) tested on 0.2 percent H$_2$SO$_4$ at 70 psi. Results appear in Table X.

TABLE X

| | | 0.2 Percent MgSO$_4$ at 70 psi | | 0.2 Percent MgSO$_4$ Retest* at 70 psi | | 0.2 Percent H$_2$SO$_4$ at 70 psi | |
|---|---|---|---|---|---|---|---|
| | Treatment | Flux (gpd) | Percent Rejection | Flux (gpd) | Percent Rejection | Flux (gpd) | Percent Rejection |
| Comparative Experiment 20 | Control | 330 | 98.8 | 281 | 98.1 | 296 | 25.9 |
| Example 31 | 0.3% peracetic acid for 16 hours followed by tannic acid | 262 | 99.1 | 228 | 98.4 | 241 | 93.2 |

TABLE X-continued

| Treatment | 0.2 Percent MgSO4 at 70 psi | | 0.2 Percent MgSO4 Retest* at 70 psi | | 0.2 Percent H2SO4 at 70 psi | |
| --- | --- | --- | --- | --- | --- | --- |
| | Flux (gpd) | Percent Rejection | Flux (gpd) | Percent Rejection | Flux (gpd) | Percent Rejection |
| colloid | | | | | | |

*After storage for 15 days in biostatic solution consisting of 1.0 percent by weight sodium metabisulfite dissolved in 80:20 water:propylene glycol.

What is claimed is:

1. A reverse osmosis membrane process for separating water from an aqueous solution containing at least one selected solute which has a solute passage through a composite crosslinked polyamide membrane at least twice that of sodium chloride at like conditions comprising: (A) contacting a first side of a treated composite crosslinked polyamide membrane with an aqueous feed solution containing said selected solute at conditions where a chemical potential exists between the first side and a second side of the membrane sufficient that water having a reduced concentration of the selected solute relative to the aqueous feed solution diffuses through the membrane from the first side to the second side: and (B) collecting the purified water from the second side of the membrane, by providing the treated composite, crosslinked polyamide membrane with properties of substantial tolerance to acidic or basic conditions and organic materials, while maintaining high water flux, by a process comprising contacting: (i) a crosslinked polyamide discriminating layer, which is derived from reactants comprising (a) a compound or polymer bearing at least two aromatic primary amine groups and (b) a compound or polymer bearing an average of more than two carboxylic acid halide groups, said reactants being interfacially polymerized on a microporous support, with (ii) an effective amount of an amine-reactive reagent or compatible oxidant, sufficient that the membrane after treatment has a water flux of at least 50 percent of the membrane prior to treatment and passage of the selected solute in an aqueous solution at the same selected solute concentration in the feed and an equivalent operating pressure at 25° C. is reduced by at least 30 percent relative to that obtained with the same membrane prior to treatment.

2. The process of claim 1 wherein (a) comprises at least 50 mole percent of m-phenylenediamine and (b) comprises at least 50 mole percent of trimesoyl chloride.

3. The process of claim 2 wherein the amine-reactive reagent is 1,3-propane sultone.

4. The process of claim 3 wherein the selected solute is sodium hydroxide.

5. The process of claim 3 wherein the selected solute is sulfuric acid.

6. The process of claim 3 wherein the selected solute is sodium nitrate.

7. The process of claim 9 wherein the selected solute is sodium nitrate.

8. The process of claim 3 wherein the selected solute is isopropanol.

9. The process of claim 2 wherein the amine-reactive reagent is nitrous acid.

10. The process of claim 9 wherein the selected solute is sodium hydroxide.

11. The process of claim 9 wherein the selected solute is sulfuric acid.

12. The process of claim 9 wherein the selected solute is isopropanol.

13. The process of claim 2 wherein the compatible oxidant is peracetic acid.

14. The process of claim 13 wherein the selected solute is sodium hydroxide.

15. The process of claim 13 wherein the selected solute is sulfuric acid.

16. The process of claim 13 wherein the selected solute is sodium nitrate.

17. The process of claim 13 wherein the selected solute is isopropanol.

18. The process of claim 1 wherein the selected solute is sulfuric acid, sodium hydroxide, sodium nitrate or isopropanol.

* * * * *